United States Patent [19]

Takahashi et al.

[11] Patent Number: 5,707,102
[45] Date of Patent: Jan. 13, 1998

[54] AUTOMOTIVE SUN ROOF DEVICE

[75] Inventors: Jun Takahashi, Yokosuka; Toshihiko Aoki, Yokohama, both of Japan

[73] Assignee: Ohi Seisakusho Co., Ltd., Yokohama, Japan

[21] Appl. No.: 763,736

[22] Filed: Dec. 11, 1996

[30] Foreign Application Priority Data

Dec. 26, 1995 [JP] Japan .................................. 7-339715

[51] Int. Cl.$^6$ .................................................. B60J 7/05
[52] U.S. Cl. .................................. 296/223; 296/221
[58] Field of Search ........................ 296/216, 221, 296/223

[56] References Cited

U.S. PATENT DOCUMENTS

| | | | |
|---|---|---|---|
| 4,923,246 | 5/1990 | Takahashi et al. | 296/221 |
| 5,026,113 | 6/1991 | DiCarlo et al. | 296/221 |
| 5,344,209 | 9/1994 | Regner | 296/223 |

FOREIGN PATENT DOCUMENTS

| | | |
|---|---|---|
| 59-202934 | 11/1984 | Japan . |
| 2 090 565 | 7/1982 | United Kingdom . |
| 2 191 739 | 12/1987 | United Kingdom . |

*Primary Examiner*—Dennis H. Pedder
*Attorney, Agent, or Firm*—Foley & Lardner

[57] ABSTRACT

A sun roof device of a motor vehicle comprises a lid member sized to cover a sun roof opening and having a weather strip disposed therearound. The lid member is capable of assuming a full close position wherein the weather strip on a front end of the lid member is pressed against a front edge of the sun roof opening. A guide rail extends along each side portion of the sun roof opening. A bracket is secured to each side portion of the lid member. A front slide member is slidably engaged with the guide rail. A pivot pin is provided through which the front slide member and a front portion of the bracket are pivotally connected. A rear slide member is slidably engaged with the guide rail and formed with first and second cam grooves. A drive arm has an upper end pivotally connected to a rear portion of the bracket. Lower and center cam followers are connected to the drive arm, which are slidably engaged with the first and second cam grooves respectively, so that when the rear slide member is moved forward from a given position, the lid member is tilted up from the full close position lifting a rear end thereof from a rear edge of the sun roof opening and when the rear slide member is moved rearward from the given position, the lid member is tilted down from the full close position lowering the rear end thereof from the rear edge of the sun roof opening. A cam groove member is further employed which is connected to the guide rail. The cam groove member has a cam groove with which the lower cam follower is slidably engaged for enforcedly separating the weather strip on the front end of the lid member from the front edge of the sun roof opening when the lid member is shifted from the full close position to the tilt-up position.

10 Claims, 7 Drawing Sheets

AUTOMOTIVE SUN ROOF DEVICE

BACKGROUND OF THE INVENTION

1. Field of the Invention

The present invention relates to automotive sun roof devices, and more particularly to automotive sun roof devices of a type including a pivotal lid member which can assume a fully closed position wherein the lid member fully closes an opening formed in a roof of the vehicle and a tilt-up position wherein the lid member is tilted up thereby opening the roof opening.

2. Description of the Prior Art

Hitherto, various types of sun roof devices have been proposed and put into practical use in the field of motor vehicles. One of such devices is shown in Japanese Patent First Provisional Publication 59-202934.

In the sun roof device of this publication, side brackets are secured to respective sides of a lid member which is placed at a sun roof opening formed in a roof of the vehicle. Guide rails are connected to respective side portions of the sun roof opening to extend along the same. Front guide members movable on and along the guide rails are pivotally connected to the side brackets through respective pivot mechanisms. A lift mechanism is arranged between each front guide member and the lid member. Geared drive cables are incorporated with the front guide members to drive the same. Each pivot mechanism comprises an obliquely extending slot which is formed in a front end of the side bracket and a guide pin which is secured to the front guide member and slidably engaged with the slot. When the lid member assumes a full closed position, the guide pin of the pivot mechanism takes an uppermost position in the slot. While, when, for opening the sun roof opening, each geared guide cable is moved in a certain direction, the lift mechanism operates to pivot the lid member upward. During this, the guide pin of the front guide member is moved toward a lowermost position of the slot causing a front end of the lid member to be separated from a front edge of the sun roof opening. With this separation, a weather strip mounted to the front end of the lid member becomes relaxed. This is very advantageous for the weather strip to restore a sufficient force needed for achieving a satisfied sealing contact with the front edge of the sun roof opening when the lid member takes the full closed position.

However, due to an inherent construction, the above-mentioned conventional sun roof device has the following drawback. That is, because of the nature of the pivot mechanism wherein the guide pin can slide in the slot, a play suppressing mechanism is needed for suppressing a play of the front guide members. The play suppressing mechanism employed in the sun roof device of the publication comprises a flat spring which is fixed to the front guide member and engageable with a stopper connected to the side bracket. Usage of such play suppressing mechanism causes increase in parts and thus increase in cost of the sun roof device.

SUMMARY OF THE INVENTION

It is therefore an object of the present invention to provide a sun roof device which is free of the drawback possessed by the device disclosed by the above-mentioned publication.

According to the present invention, there is provided a sun roof device of a motor vehicle with a roof, which comprises means defining a sun roof opening in the roof; a lid member sized to cover the run roof opening and having a weather strip disposed therearound, the lid member being capable of assuming a full close position relative to the sun roof opening wherein the weather strip on a front end of the lid member is pressed against a front edge of the sun roof opening; a guide rail extending along each side portion of the sun roof opening; a bracket secured to each side portion of the lid member; a front slide member slidably engaged with the guide rail; a pivot pin through which the front slide member and a front portion of the bracket are pivotally connected; a rear slide member slidably engaged with the guide rail, the rear slide member being formed with first and second cam grooves; a drive arm having an upper end pivotally connected to a rear portion of the bracket; lower and center cam followers connected to the drive arm, which are slidably engaged with the first and second cam grooves respectively, so that when the rear slide member is moved forward from a given position, the lid member is tilted up from the full close position lifting a rear end thereof from a rear edge of the sun roof opening and when the rear slide member is moved rearward from the given position, the lid member is tilted down from the full close position lowering the rear end thereof from the rear edge of the sun roof opening; and a cam groove member connected to the guide rail, the cam groove member having a cam groove with which the lower cam follower is slidably engaged for enforcedly separating the weather strip on the front end of the lid member from the front edge of the sun roof opening when the lid member is shifted from the full close position to the tilt-up position.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Throughout the description, the terms, such as, forward, rearward, rightward, leftward and the like are used with respect to a motor vehicle to which the sun roof device of the invention is applied.

The sectional views of FIGS. 1, 2, 4, 5, 6 and 7 are views provided by a cutting plane which vertically extends in a left side portion of a roof of the vehicle.

Figure 1:
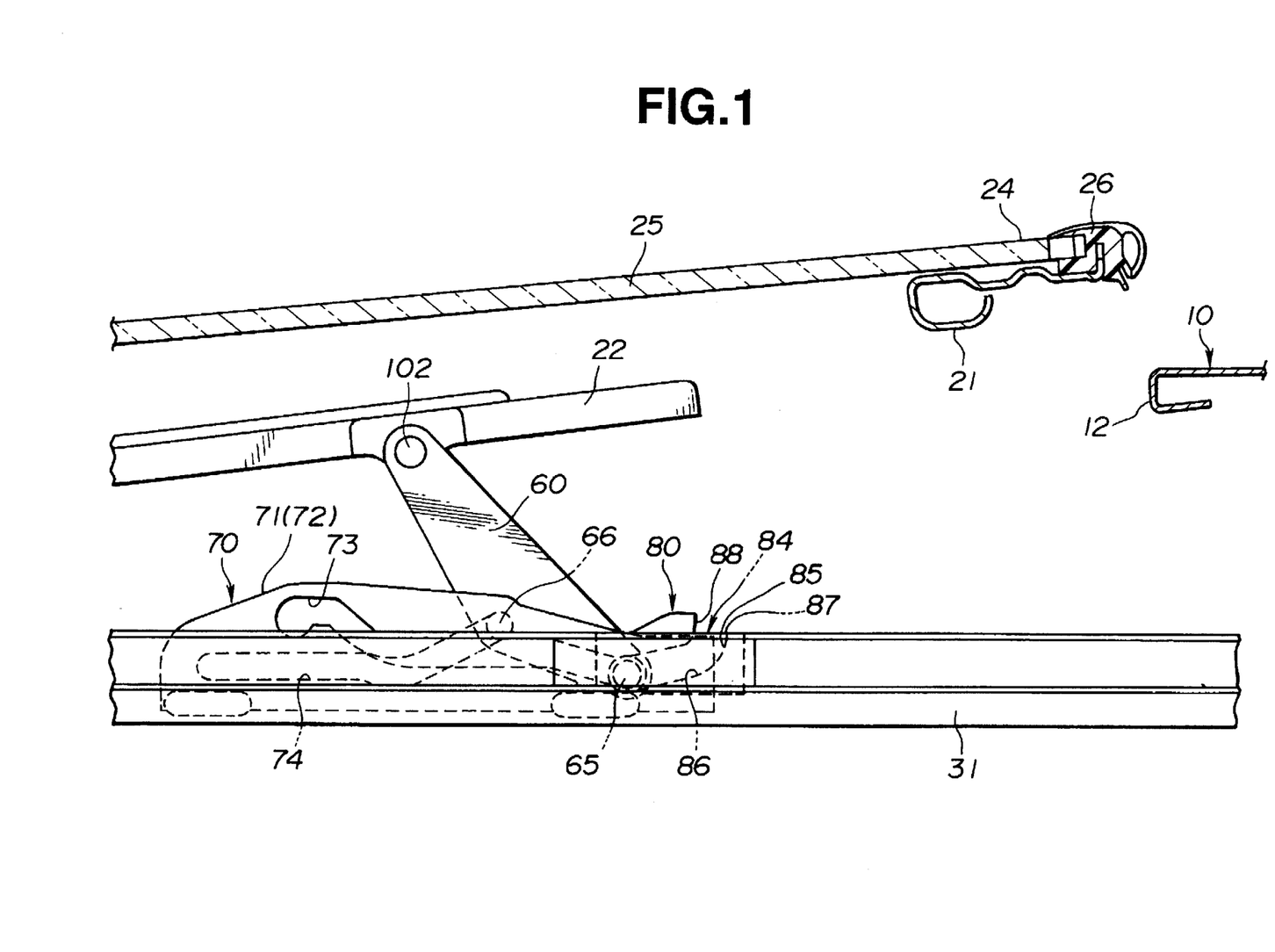
FIG. 1 is a sectional view of a rear part of a sun roof device of the present invention, showing a tilt-up condition of a lid member.
Figure 2:
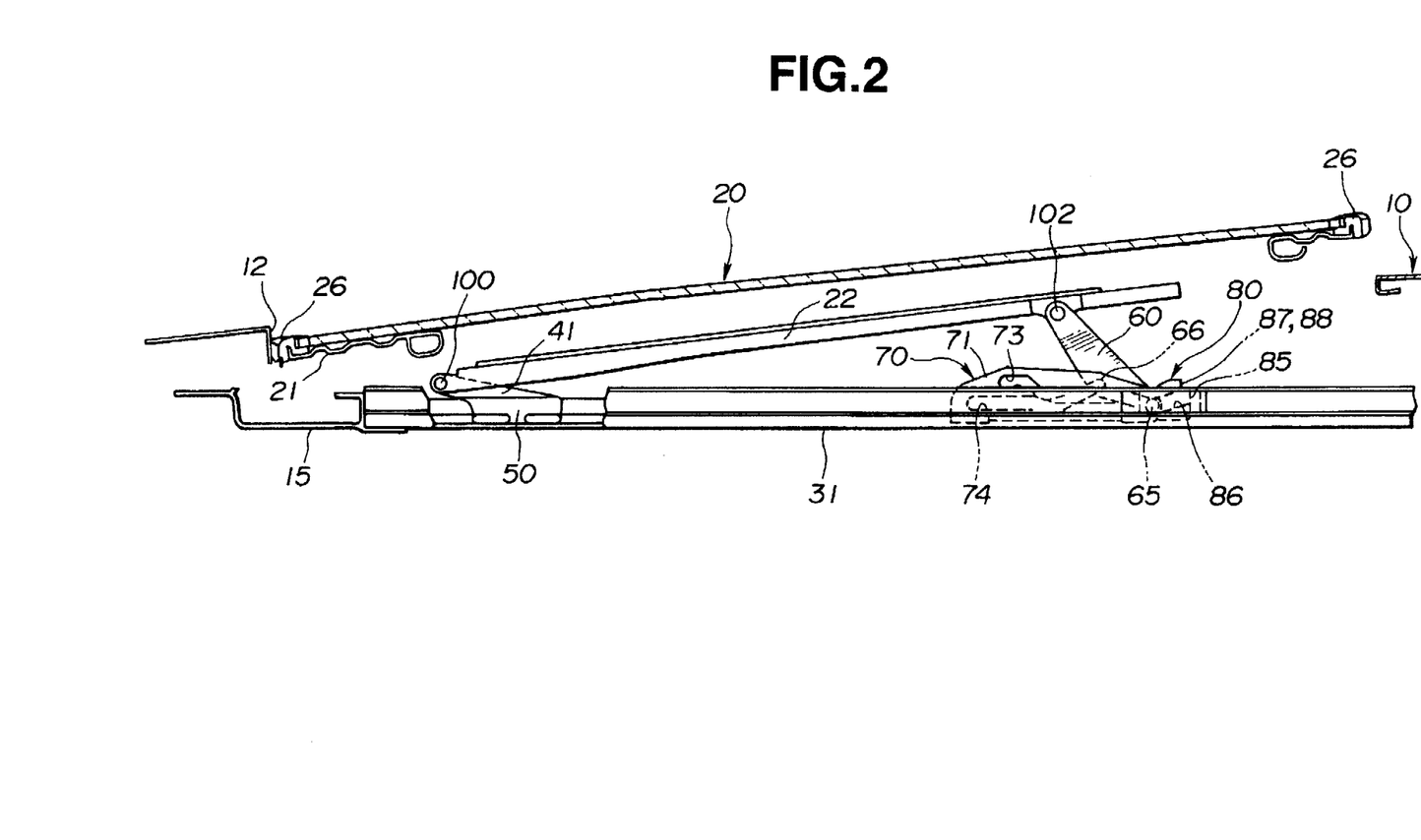
FIG. 2 is a sectional view of the entire of sun roof device of the present invention, showing the tilt-up condition of the lid member.

Referring to the accompanying drawings, particularly FIGS. 1 and 2, there is shown an automotive sun roof device according to the present invention.

Denoted by numeral 10 in the drawings is a roof of a motor vehicle. The roof 10 is provided with a rectangular opening 12, which will be referred to as "sun roof opening" in the following. Denoted by numeral 15 in FIG. 2 is a ceiling member of a passenger room. Of course, the ceiling member 15 is formed with a rectangular opening which faces the sun roof opening 12 of the roof 10.

For selectively closing and opening the sun roof opening 12, a lid member 20 is mounted on the roof 10 through a tilt and slide mechanism which will be described in detail hereinafter.

As is understood from FIG. 1, the lid member 20 comprises a rectangular frame structure 21, a rectangular glass pane 25 held by the frame structure 21 and a weather strip 26 disposed on both a periphery of the frame structure 21 and that of the glass pane 25. That is, the lid member 20 has the weather strip 26 disposed therearound.

The tilt and slide mechanism comprises elongate lid brackets 22 which are secured to laterally opposed portions of the rectangular frame structure 21 in a manner to extend along the same.

Figure 4:
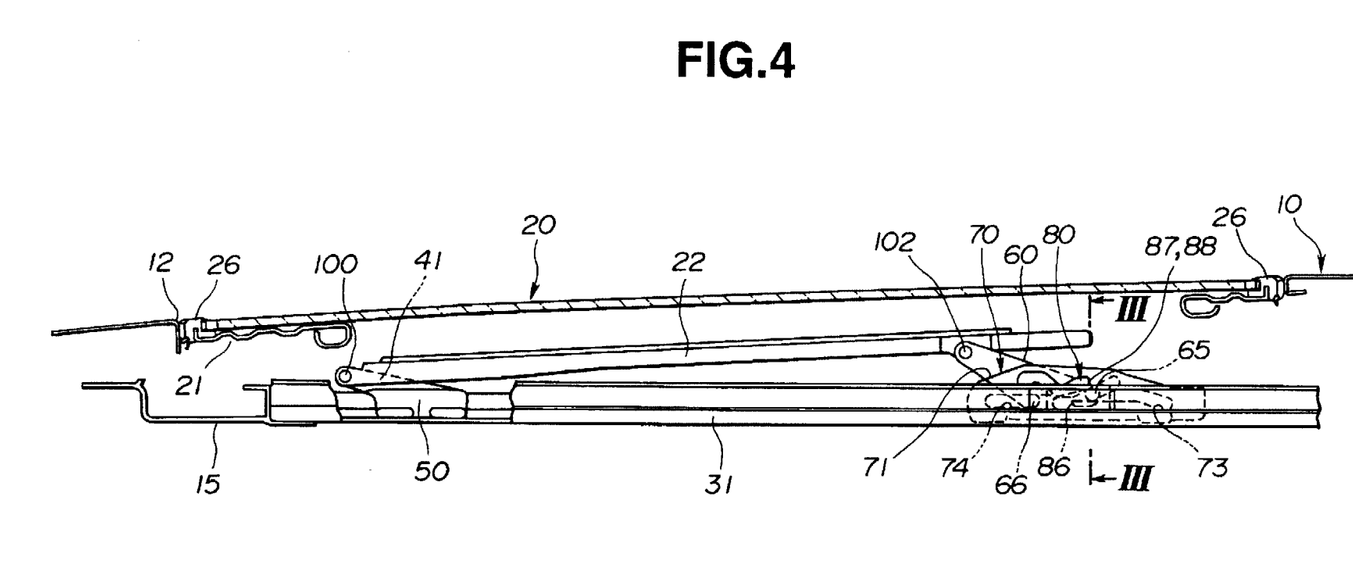
FIG. 4 is a view similar to FIG. 2, but showing a full closed condition of the lid member.
Figure 6:
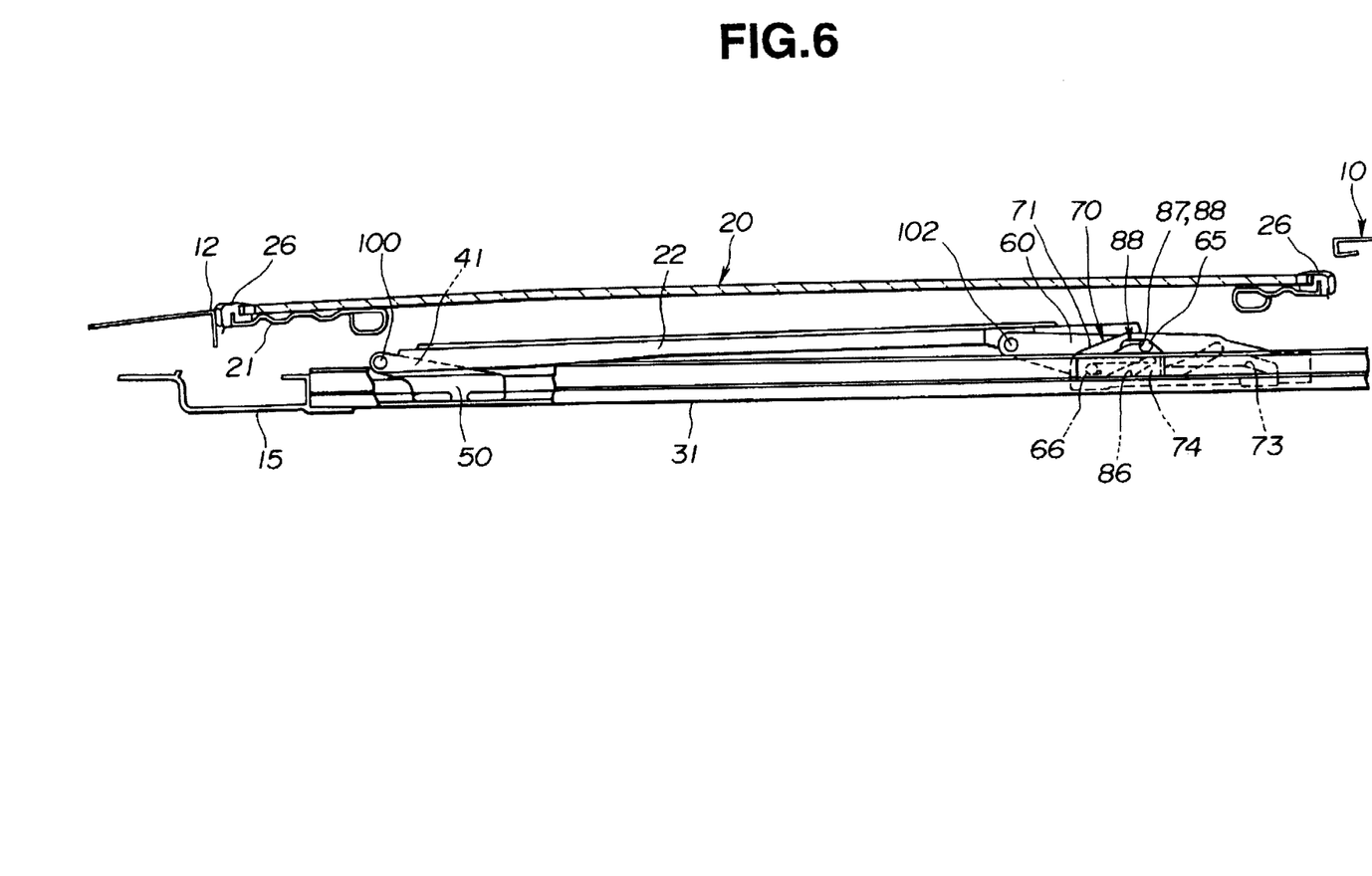
FIG. 6 is a view similar to FIG. 2, but showing a tilt-down condition of the lid member.

As will become apparent as the description proceeds, due to provision of the tilt and slide mechanism, the lid member 20 can assume four distinct positions which are a full close position as shown in FIG. 4 wherein the lid member 20 fully closes the sun roof opening 12, a tilt-up position as shown in FIG. 2 wherein the lid member 20 is slightly inclined forward slightly opening the sun roof opening 12, a tilt-down position as shown in FIG. 6 wherein the lid member 20 is slightly inclined rearward providing a slight clearance between a rear end of the lid member 20 and a rear edge portion of the sun roof opening 12, and a full open position (not shown) wherein the lid member 20 is in a rear retracted portion fully opening the sun roof opening 12.

A pair of guide rails 31 are mounted to and extend along respective lateral side edges of the rectangular opening of the ceiling member 15. A pair of front slide members 50 are slidably engaged with the guide rails 31 respectively, and a pair of rear slide members 70 are slidably engaged with the guide rails 31 respectively.

As is understood from FIG. 2, the rear slide members 70 are placed behind the front slide members 50.

Figure 3:
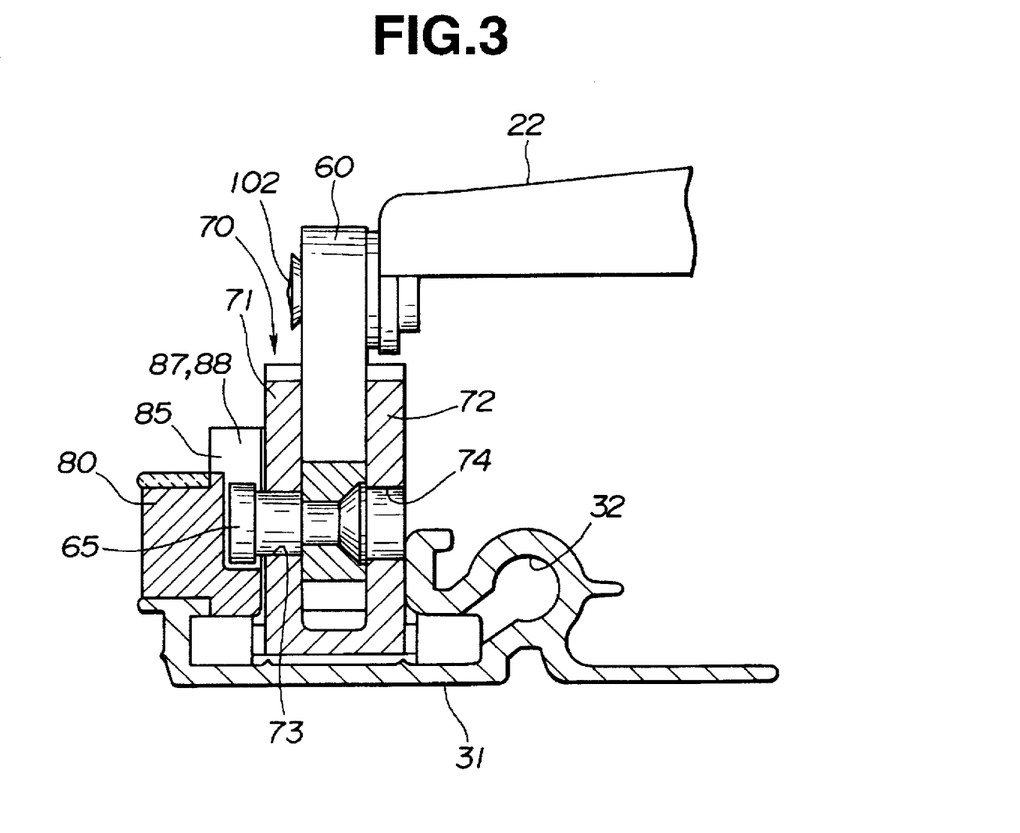
FIG. 3 is an enlarged sectional view taken along the line III—III of FIG. 4.

As is seen from FIG. 3, each guide rail 31 is formed with a longitudinally extending tunnel 32 through which a geared cable (not shown) extends. The geared cable is fixed to the corresponding rear slide member 70 to drive the same. The front slide member 50 is free from the geared cable. Although not shown in the drawings, the geared cable is driven by an electric power device located at a front center portion of the ceiling 15.

As is seen from FIG. 3, each rear slide member 70 has a generally U-shaped cross section with outside and inside wall portions 71 and 72.

As is seen from FIG. 2, a pair of front arms 41 are secured to the front slide members 50 to move therewith. Each front arm 41 has a front end to which a front end of the corresponding elongate lid bracket 22 is pivotally connected through a pivot pin 100.

As is well shown in FIGS. 1 and 3, the elongate lid bracket 22 has a rear portion to which an upper end of a drive arm 60 is pivotally connected through a pivot pin 102. The drive arm 60 is pivotally disposed between the outside and insider wall portions 71 and 72 of the rear slide member 70 and is provided at a lower end thereof with a lower cam follower 65 and at a center portion thereof with a center cam follower 66 (see FIG. 1).

As is seen from FIG. 3, the lower cam follower 65 extends laterally outward. While, the center cam follower 66 extends laterally inward.

As is seen in FIG. 1, the outside wall portion 71 of the rear slide member 70 is formed with an outside cam groove (or first cam groove) 73 with which the lower cam follower 65 is slidably engaged. The outside cam groove 73 is shaped to extend rearward and obliquely downward from a front portion thereof. While, the inside wall portion 72 of the rear slide member 70 is formed with an inside cam groove (or second cam groove) 74 with which the center cam follower 66 is slidably engaged. The inside cam groove 74 is shaped to extend horizontally from a front portion thereof and extend obliquely upward.

As is well shown in FIG. 3, to an outside portion of each guide rail 31, there is detachably connected a cam groove member 80 through bolts (not shown). The entire of the cam groove member 80 is shown in FIG. 8.

Figure 8:
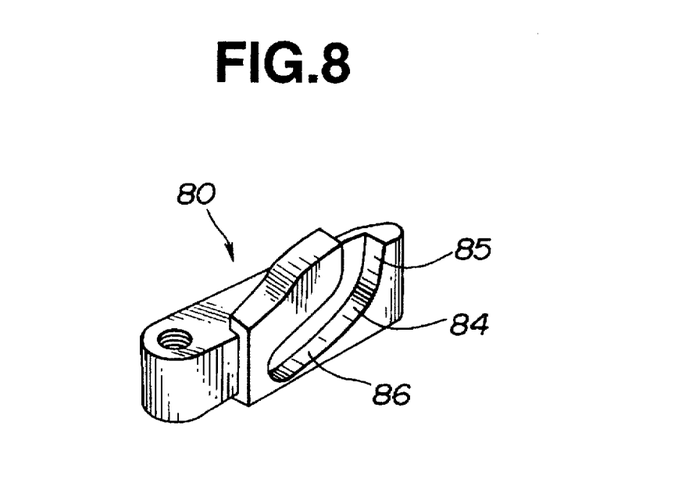
FIG. 8 is a perspective view of a cam groove member employed in the invention.

As is seen from FIGS. 8 and 1, the cam groove member 80 is formed with a generally L-shaped cam groove 84 which includes a vertically extending part 85 and an obliquely extending part 86.

As will be described in detail hereinafter, the generally L-shaped cam groove 84 is so shaped as to provide the sun roof device of the device with the following advantageous operations.

First, when the lid member 20 is shifted from the full close position of FIG. 4 to the tilt-up position of FIG. 2, the lid member 20 is somewhat displaced rearward thereby to separate a front end thereof from a front edge of the sun roof opening 12. With this, the weather strip 26 on the front end of the lid member 20 can be relaxed when assuming the tilt-up position.

Second, when the lid member 20 is shifted from the full close position of FIG. 4 to the tilt-down position of FIG. 6, a rear end of the lid member 20 is vertically and instantly moved down. With this, the weather strip 26 on the rear end of the lid member 20 is suppressed from being strongly rubbed by the rear edge of the sun roof opening 12.

As is seen from FIG. 1, when the lid member 20 assumes the tilt-up position, the lower cam follower 65 of the drive arm 60 takes a rearmost position in the outside cam groove 73 and at the same time takes a frontmost position in the L-shaped cam groove 84.

Thus, when, under this condition, the rear slide member 70 is moved rearward for shifting the lid member 20 to the full close position, the lower cam follower 65 is slid rearward in the obliquely extending part 86 and finally led to the vertically extending part 85. When now the rear slide member 70 is then moved forward for shifting the lid member 20 to the tilt-up position, the lower cam follower 65 is returned back to the obliquely extending part.

When the rear slide member 70 is moved rearward for shifting the lid member 20 from the full close position to the tilt-down position, the lower cam follower 65 becomes disengaged from the vertically extending part 85 of the cam groove 84. For achieving this disengagement, the vertically extending part 85 has a terminal end 87 opened. Upon disengagement of the lower cam follower 65 from the opened terminal end 87, the lid member 25 is permitted to slide rearward toward a retracted position with an aid of the geared cable. When the lid member 25 comes to the retracted position, the sun roof opening 12 is fully opened.

In the following, operation of the sun roof device will be described.

Figure 5:
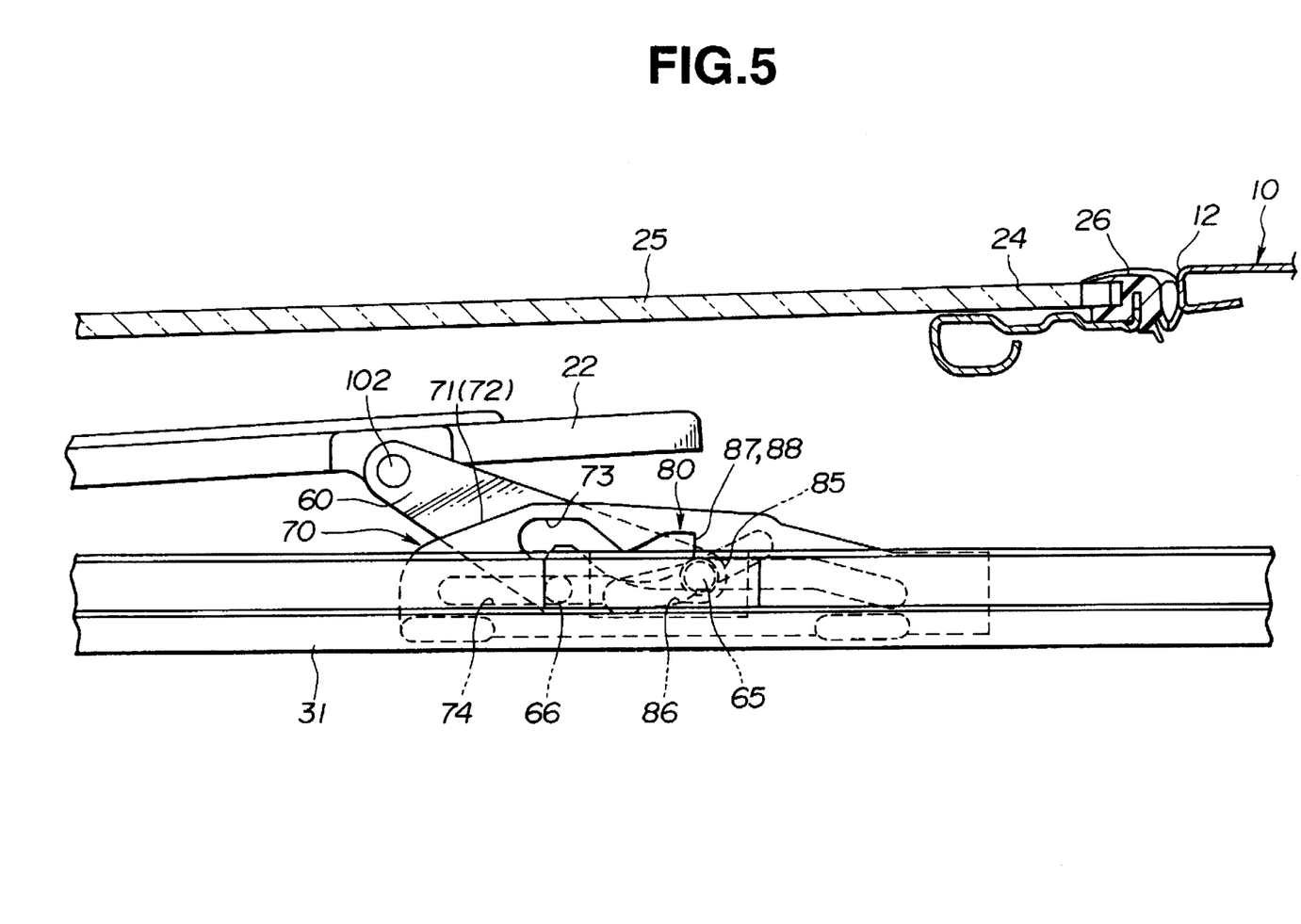
FIG. 5 is a view similar to FIG. 1, but showing the full closed condition of the lid member.

For ease of explanation, the description will be commenced with respect to the full close position of the lid member 20, as shown in FIGS. 4 and 5. Under this condition, the lid member 20 fully closes the sun roof opening 12 having the weather strip 26 tightly pressed against the peripheral wall of the sun roof opening 12. Each drive arm 60 takes such an angular position that the center cam follower 66 is in engagement with the inside cam groove 74 of the rear slide member 70 and the lower cam follower 65 is in engagement with both the outside cam groove 73 of the rear slide member 70 and the vertically extending part 85 of the cam groove member 80. More specifically, the center cam follower 66 is in a generally middle position of the inside cam groove 74, and the lower cam follower 65 is in a generally middle position of the outside cam groove 73 and in the vertically extending part 85 of the cam groove member 80, as shown, When now for achieving the tilt-up condition of the lid member 20, the rear slide member 70 is moved forward by the geared cable, the center cam follower 66 is slid rearward in the inside cam groove 74 and the lower cam follower 65 is slid rearward in the outside cam groove 73 while sliding forward in the L-shaped cam groove 84 of the cam groove member 80. During this, the drive arm 60 is gradually raised rearward using the center and lower cam followers 66 and 65 as pivot means.

With this raising movement of the drive arm 60, the lid member 20 is pivoted about the pivot pin 100 lifting the rear end portion thereof, and finally brought to the tilt-up position as shown in FIGS. 1 and 2.

During this, the lower cam follower 65 is slid down from the vertically extending part 85 to the obliquely extending part 86 of the elongate cam groove 84 of the cam groove member 80. With this movement, the entire of the lid member 20 is slightly shifted obliquely rearward. Thus, the weather strip 26 on the front end of the lid member 20 is separated from the front edge of the sun roof opening 12. That is, when the lid member 20 is in the tilt-up position, entire of the weather strip 26 is fully relaxed. As has been mentioned hereinabove, this is very advantageous for the weather strip 26 to restore a sufficient force needed for achieving a satisfied sealing contact with the peripheral edge of the sun roof opening 12 when the lid member 20 takes the full close position.

Figure 7:
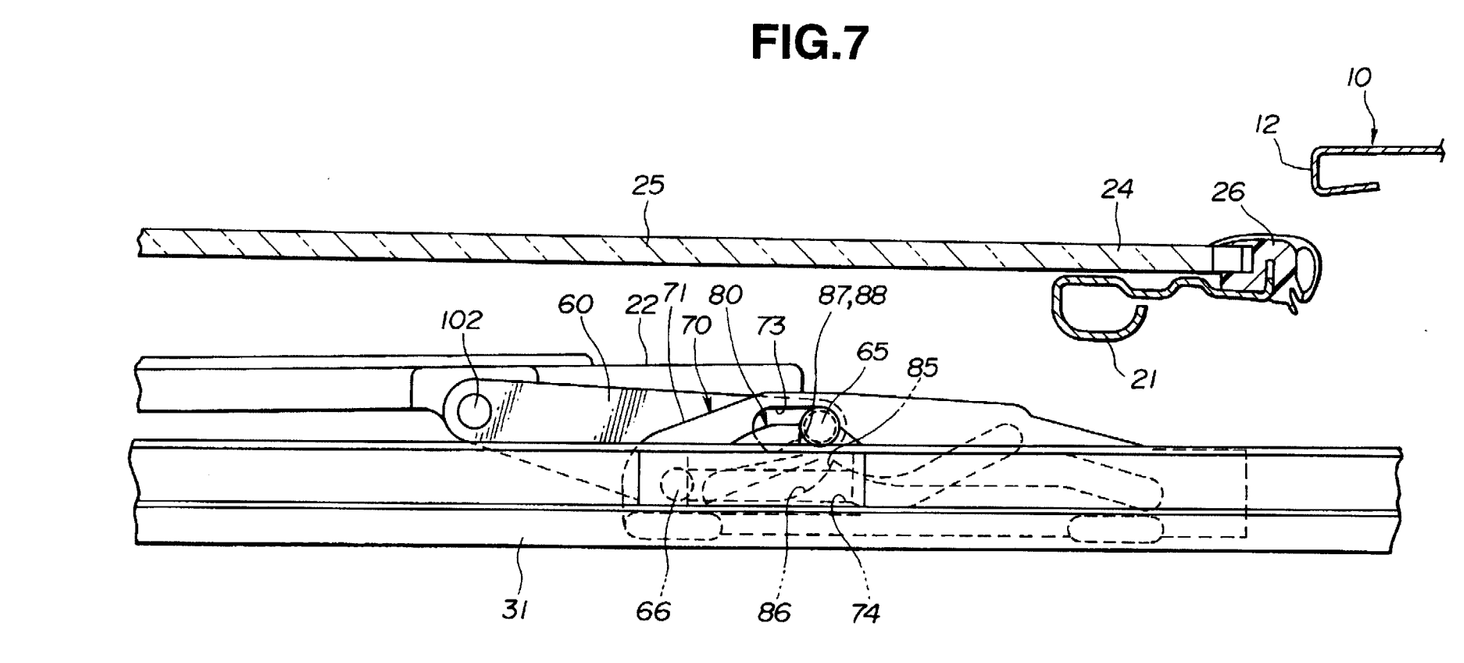
FIG. 7 is a view similar to FIG. 1, but showing the tilt-down condition of the lid member.

When, with the lid member 20 assuming the full close position, the rear slide member 70 is moved rearward by the geared cable, the center cam follower 66 is slid forward in the inside cam groove 74 and contact the front end of the same and the lower cam follower 65 is slid forward that is obliquely upward in the outside cam groove 73 and at the same time the lower cam follower 65 is slid up to the terminal open end 87 of the L-shaped cam groove 84 of the cam groove member 80. With this, the lid member 20 is forced to pivot to the tilt-down position as shown in FIGS. 6 and 7. As has been mentioned hereinbefore, during this, the rear end of the lid member 20 is vertically and instantly moved down and thus the weather strip 26 on the rear end is suppressed from being strongly rubbed by the rear edge of the sun roof opening 12.

When thereafter the rear slide member 70 is further moved rearward by the geared cable, the lower cam follower 65 is finally disengaged from the opened terminal end 87 of the cam groove 84. Thus, thereafter, with the rearward movement of the geared cable, the lid member 20 is moved to the retracted position thereby fully opening the sun roof opening 12. During this rearward movement of the lid member 20, the center cam follower 66 is kept in contact with the front end of the inside cam groove 74, and the lower cam follower 65 slides on the top of the guide rail 31.

When, with the lid member 20 kept in the retracted position, the rear slide member 70 is moved forward by the geared cable, the lower cam follower 65 is brought into abutment with a front wall 88 of the opened terminal end 87 and thus engages with the cam groove 84 of the cam groove member 80. That is, the lid member 20 returns back to the tilt-down position as shown in FIGS. 6 and 7. Thus, thereafter, with the forward movement of the geared cable, the drive arm 60 is gradually raised to cause the lid member 20 to take the full close position as shown in FIGS. 4 and 5.

As is described hereinabove, in the sun roof device of the present invention, there is employed a cam groove member 80 which has a generally L-shaped cam groove 84 with which a lower cam follower 65 of a drive arm 60 is slidably engaged.

As has been described hereinbefore, with provision of such L-shaped elongate cam groove 84, the following advantageous operations are obtained.

First, when the lid member 20 is shifted from the full close position to the tilt-up position, the lid member 20 is somewhat displaced rearward thereby to separate the front end thereof from a front edge of the sun roof opening 12. Thus, the weather strip 26 on the front end of the lid member 20 can be kept relaxed when assuming the tilt-up position.

Second, when the lid member 20 is shifted from the full close position to the tilt-down position, the rear end of the lid member 20 is vertically and instantly moved down. Thus, the weather strip 26 on the rear end of the lid member 20 can be suppressed from being strongly rubbed by the rear edge of the sun roof opening 12.

What is claimed is:

1. A sun roof device of a motor vehicle with a roof, comprising:

means defining a sun roof opening in said roof;

a lid member sized to cover said sun roof opening and having a weather strip disposed therearound, said lid member being capable of assuming a full close position relative to said sun roof opening wherein the weather strip on a front end of said lid member is pressed against a front edge of said sun roof opening;

a guide rail extending along each side portion of the sun roof opening;

a bracket secured to each side portion of said lid member;

a front slide member slidably engaged with said guide rail;

a pivot pin through which said front slide member and a front portion of said bracket are pivotally connected;

a rear slide member slidably engaged with said guide rail, said rear slide member being formed with first and second cam grooves;

a drive arm having an upper end pivotally connected to a rear portion of said bracket;

lower and center cam followers connected to said drive arm, which are slidably engaged with said first and second cam grooves respectively, so that when said rear slide member is moved forward from a given position, said lid member is tilted up from said full close position lifting a rear end thereof from a rear edge of said sun roof opening and when said rear slide member is moved rearward from said given position, said lid member is tilted down from said full close position lowering the rear end thereof from the rear edge of said sun roof opening; and a cam groove member connected to said guide rail, said cam groove member having a cam groove with which said lower cam follower is slidably engaged for enforcedly separating the weather strip on the front end of said lid member from the front edge of said sun roof opening when said lid member is shifted from the full close position to the tilt-up position.

2. A sun roof device as claimed in claim 1, in which said cam groove of said cam groove member has a generally L-shape which includes a vertically extending part and an obliquely extending part.

3. A sun roof device as claimed in claim 2, in which said vertically extending part has an opened terminal end from which said lower cam follower is disengaged when, with said lid member assuming the tilt-down position, said rear slide member is further moved rearward.

4. A sun roof device as claimed in claim 3, in which said cam groove member is detachably connected to said guide rail by threaded connection.

5. A sun roof device as claimed in claim 4, in which said cam groove member is connected to an outside portion of said guide rail.

6. A sun roof device as claimed in claim 1, in which said lower cam follower is connected to a lower end portion of said drive arm and said center cam follower is connected to a center portion of said drive arm.

7. A sun roof device as claimed in claim 6, in which said rear slide member is formed with outside and inside wall portions which are formed with said first and second cam grooves respectively.

8. A sun roof device as claimed in claim 7, in which said drive arm is movably disposed between said outside and inside portions of said rear slide member having said lower and center cam followers slidably engaged with said first and second cam grooves of said rear slide member.

9. A sun roof device as claimed in claim 8, in which said lower cam follower extending outward through said first cam groove is slidably engageable with the cam groove of said cam groove member.

10. A sun roof device as claimed in claim 1, in which the cam groove of said cam groove member is so shaped as to vertically move down a rear end of said lid member when said lid member is shifted from the full close position to the tilt-down position.

* * * * *